United States Patent
Takakura et al.

(10) Patent No.: US 7,005,177 B2
(45) Date of Patent: Feb. 28, 2006

(54) HARD-FACED FRICTION MATING MEMBER

(75) Inventors: Norio Takakura, Chitose (JP); Yuzuru Sanbongi, Chitose (JP); Shintaro Kameya, Chitose (JP)

(73) Assignee: Dynax Corporation, Chitose (JP)

( * ) Notice: Subject to any disclaimer, the term of this patent is extended or adjusted under 35 U.S.C. 154(b) by 0 days.

(21) Appl. No.: 10/696,241

(22) Filed: Oct. 29, 2003

(65) Prior Publication Data

US 2004/0206600 A1    Oct. 21, 2004

(30) Foreign Application Priority Data

Apr. 18, 2003   (JP) .............................. 2003-114625

(51) Int. Cl.
*B32B 3/30* (2006.01)
*F16D 69/02* (2006.01)

(52) U.S. Cl. .................. 428/141; 428/156; 428/698; 428/220; 192/107 M; 192/70.14

(58) Field of Classification Search ............... 428/141, 428/156, 698, 220; 192/70.14, 107 M
See application file for complete search history.

(56) References Cited

U.S. PATENT DOCUMENTS

| 4,667,534 | A | * | 5/1987 | Kataoka | ..................... 475/160 |
| 5,029,686 | A | * | 7/1991 | Yesnik | ..................... 192/70.14 |

FOREIGN PATENT DOCUMENTS

| JP | 4-272517 | 9/1992 |
| JP | 4-366029 | 12/1992 |

* cited by examiner

*Primary Examiner*—William P. Watkins, III
(74) *Attorney, Agent, or Firm*—Howson and Howson

(57) ABSTRACT

A friction mating member is fabricated by providing a surface of a base member with a hard coating having a load point displacement characteristic in which the elastic range, that is, the ratio of elastic deformation to maximum indentation depth, is at least 50% in a load range from 1 to 50 mN. The friction mating member is capable of coping with both an increasing friction coefficient in a high-speed range and decreasing friction coefficient in a low-speed range, without being affected by the type and deterioration of the lubricating oil. The friction mating member maintains an m-V characteristic having a positive gradient over a long period of use. Thus, the friction mating member solves problems attributable to noise and vibration.

4 Claims, 6 Drawing Sheets

Fig.5

| | | Example | Comp. Example 1 | Comp. Example 2 | Comp. Example 3 | Comp. Example 4 |
|---|---|---|---|---|---|---|
| Coating Property | Coating | carbonaceous composite | Cr or Tin | Carbonaceous | Carbonaceous composite | None (barrel finish) |
| | Ratio of elastic deformation to maximum indentation depth | 65% | 48% | 80% | 70% | 17% |
| | Protrusion area ratio | 7% | None | 2% | 8% | None |
| | Surface roughness | Ra.10nm | Ra.50nm | Ra.8nm | Ra.12nm | None |
| Base member | Surface roughness | Ra.0.05 μm | Ra.0.05 μm | Ra.0.05 μm | Ra.1.0 μm | Ra.0.2~0.3 μm |
| Torque waveform Pressure:8Kg/cm² Temp: 100°C | | | | | | |

HARD-FACED FRICTION MATING MEMBER

FIELD OF THE INVENTION

This invention relates to a friction mating member, i.e., a contact member, for an oil-immersed friction device included in a power transmission mechanism for power transmission or power interception. More specifically, the invention relates to a contact part, such as a separator plate in a wet frictional interlocking mechanism, such as a wet-type, multiple-disc clutch, a multiple-disc brake included in an automatic transmission, a friction mating member, such as a torque converter cover included in a lock-up clutch, or a drum of a band brake.

BACKGROUND OF THE INVENTION

An automotive automatic transmission includes a multiple-disc clutch, provided with alternately arranged friction discs and separator plates, and immersed in an automatic transmission fluid (ATF) serving as a lubricating oil. The friction plates and the separator plates are frictionally engaged by being pressed against one another to transmit power, or disengaged, by removing engagement pressure, to intercept power transmission.

Although some conventional brake drums, are formed of gray cast iron, generally, brake drums are formed of steels, i.e., carbon steels, superior in strength and toughness to gray cast iron. A separator plate of a wet type multiple-disc clutch or a multiple-disc brake is formed by punching a steel sheet, such as a cold-rolled steel sheet, to produce an annular plate, deburring and grinding the annular plate, and finishing the deburred annular plate by a polishing process, such as barrel finishing.

In the initial stage of use, before the friction members and the friction mating members have adapted to each other, the friction coefficient between the friction members and the friction mating members is unstable, and the friction device exhibits a phenomenon known as "shudder," sometimes referred to as "judder," characterized by the generation of noise and vibration as the friction members and the friction mating members become engaged with one another.

Frictional vibration is the principal cause of shudder, and the dependence of the friction coefficient on speed (the so-called "$\mu$-V characteristic") is considered to have a strong influence on frictional vibration. Generally, the occurrence of shudder can be almost entirely avoided when the $\mu$-V characteristic curve, indicating the variation of the friction coefficient with speed, has a positive gradient, that is, increased friction in the high-speed range and decreased friction in the low-speed range.

Various ways have been proposed to provide a friction device with an $\mu$-V characteristic having a positive gradient. One proposal for improving the $\mu$-V characteristic was to increase the roughness of the surface of a friction mating member by barrel finishing to increase the friction coefficient in the high speed range. However, the friction coefficient in the low-speed range is highly dependent on the effect of the friction modifier (FM) contained in the lubricating oil, and the friction coefficient changes when the lubricating oil deteriorates or when the lubricating oil is changed. Thus, when the $\mu$-V characteristic is affected adversely by the lubricating oil, a positive gradient in the $\mu$-V characteristic of a friction device cannot necessarily be achieved solely by increasing the friction coefficient in the high-speed range.

Another known contact part has a hard surface coating having a smooth surface with minute roughness. The surface of a friction member used in combination with this known contact part is finely polished, and the smoothness of the surface of the friction member is improved as the contact part and the friction member slide relative to each other. The apparent contact area of the friction member is increased, and the surface of the friction member is coated with a uniform, thin, oil coating. Consequently, the friction coefficient between the friction mating member and the friction member in a high-speed range is increased.

A friction mating member having such a hard coating is formed by applying, to a base member, a coating of amorphous carbon or a ceramic material, such as TiN, having an irregular thickness and a distributed particle size. Such a friction mating member is disclosed in Unexamined Japanese Patent Publication No. 366029/1992. Another friction mating member, disclosed in Unexamined Japanese Patent Publication No. 272517/1992, is formed by coating a base member, having a surface finished by lapping, with a TiN coating.

As is generally known, a carbonaceous coating material, such as amorphous carbon, is chemically stable. Hence, it is difficult for an additive contained in a lubricating oil to form a boundary coating on the surface of the carbonaceous coating. It is known that a carbonaceous coating is satisfactory in abrasion resistance, and exhibits a low friction coefficient, in the range of 0.1 to 0.2, under unlubricated conditions in a low-speed range, owing to its own self-lubricating characteristic and physical properties.

The $\mu$-V characteristics of the friction mating members mentioned in the above-identified patent documents are improved to some extent, but are still not entirely satisfactory. This invention addresses the foregoing problems. It is an object of the invention to provide a friction mating member having an improved $\mu$-V characteristic, in which the friction coefficient in the low-speed range is reduced without being affected by the type of lubricating oil or by deterioration of components of the lubricating oil, and in which the friction coefficient is increased in the high-speed range.

SUMMARY OF THE INVENTION

The friction mating member in accordance with the invention comprising a base member, and a hard coating applied on the base member. The hard coating has a load point displacement characteristic in which the ratio of elastic deformation to maximum indentation depth, in a load range from 1 to 50 mN, is at least 50%.

In a preferred embodiment of the invention, semispherical protrusions, having diameters in the range of 1 to 5 $\mu$m, are formed on the outer surface of the hard coating. The ratio of the area occupied by the protrusions to the total area of the outer surface of the hard coating is at least 3%, and the arithmetic average surface roughness Ra of the outer surface of the hard coating, excluding the semispherical protrusions, is in the range of 4 to 50 nm. On the other hand, the arithmetic average surface roughness Ra of the base member is preferably not greater than 0.07 $\mu$m. The thickness of the hard coating is preferably in the range from 1 to 20 $\mu$m, and in a preferred embodiment, the hard coating is formed of a composite material containing tungsten carbide and amorphous carbon.

Since the hard coating has a load point displacement characteristic in which the ratio of elastic deformation to maximum indentation depth, in a load range of 1 to 50 mN, is at least 50%, the friction mating member is capable of coping with both an increasing friction coefficient in the high-speed range, and a decreasing friction coefficient in the low-speed range, without being affected by the type of lubricating oil, or its deterioration. The coating maintains a μ-V characteristic, having a positive gradient, over a long period of use. By maintaining a μ-V characteristic having a positive gradient, the coating suppresses shuddering, and avoids problems resulting from noise and vibration.

BRIEF DESCRIPTION OF THE DRAWINGS

FIG. 5 is a table showing the construction, frictional properties and μ-V characteristics of friction mating members in an example of the invention and in four comparative examples, numbered 1 to 4;

DETAILED DESCRIPTION OF THE PREFERRED EMBODIMENTS

Figure 1:
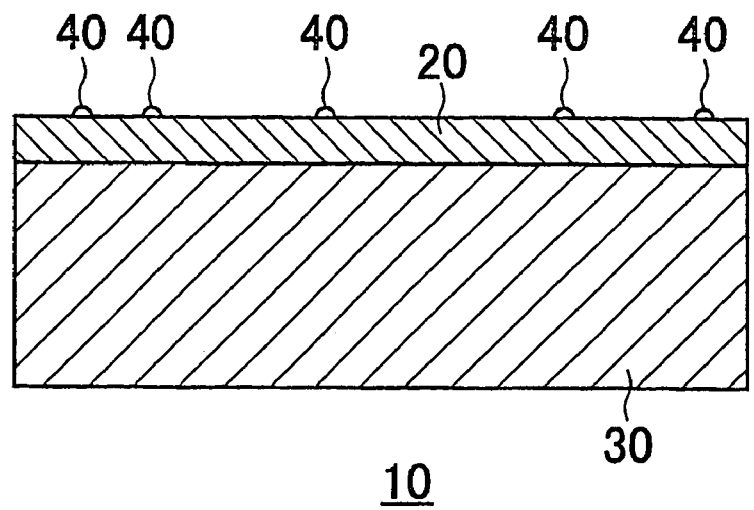
FIG. 1 is a sectional view of a typical friction mating member in a preferred embodiment according to the invention.

As shown in FIG. 1, the friction mating member 10 is formed by providing a surface of a base member 30 with a hard coating 20. The hard coating 20 has a load point displacement characteristic in which the ratio of elastic deformation to maximum indentation depth (hereinafter referred to as the "elastic range"), in a load range of 1 to 50 mN, is at least 50%. The load point displacement characteristic is measured by a measuring method specified in ISO 14577-1. Since the hard coating 20 has an elastic range of at least 50%, a small friction coefficient can be provided in the low-speed range.

A hard coating 20 having an elastic range of at least 50% can be formed by depositing amorphous carbon, or a composite material containing amorphous carbon and tungsten carbide, onto the base member 30 by physical vapor deposition or chemical vapor deposition. Semispherical protrusions 40, composed of the same material as that forming the hard coating 20, are formed on the outer surface of the hard coating 20. The semispherical protrusions 40 can also be formed on the surface of the hard coating 20 by depositing amorphous carbon, or a composite material containing amorphous carbon and tungsten carbide, onto the base member 30 by a physical vapor deposition or chemical vapor deposition. The semispherical protrusions 40 increase the friction coefficient in the high speed range by slightly grinding, and smoothing the surface of, the mating friction member.

The diameters of the semispherical protrusions are in the range of 1 to 5 μm. The friction member will be abraded excessively if the semi-spherical protrusions 40 have diameters greater than 5 μm.

Preferably, the ratio of an area occupied by all the semispherical protrusions 40 to the area of the surface of the hard coating 20 is at least 3%. If this ratio is less than 3%, the load on the semispherical protrusions 40 becomes excessive, and the semispherical protrusions 40 will wear out rapidly and become unable to exert a slight grinding action on the friction member, and the surface of the friction member will not be made smooth.

Preferably, the base member 30 has a surface having an arithmetic average surface roughness Ra not greater than 0.07 μm. When the base member 30 has a low surface roughness, the hard coating 20 is able to come into uniform contact with the friction member, and the sliding property of the hard coating 20 can be utilized fully, so that the frictional coefficient in the low-speed range can be reduced.

Preferably, the hard coating 20 on the surface of the base member 30 has a thickness in the range of 1 to 20 μ, μm, and the surface of the hard coating 20, excluding the semispherical protrusions 40, has an arithmetic average surface roughness Ra in the range from 4 to 50 nm. With its surface roughness in this range, the hard coating 20 grinds the surface of the friction member slightly when the contact part 10 slides relative to the friction member. Consequently, the smoothness of the surface of the friction member is improved, the apparent contact area increases, a uniform, thin coating of oil is formed, and the friction coefficient in the high-speed range increases.

The hard coating 20 has a satisfactory oil-holding property because the surface of the hard coating has a very low degree of roughness. Therefore, the friction coefficient in a low-speed range is low. Generally, the friction coefficient in the low-speed range is highly dependent on the effect of boundary friction, and the property of a boundary coating of additives contained in the lubricating oil significantly affects the friction coefficient in the low-speed range. The hard coating 20 in accordance with the invention is chemically stable, and hence the additives contained in the lubricating oil have difficulty in forming a boundary coating on the surface of the hard coating. Therefore, the friction coefficient in the low-speed range is not significantly affected by the additives, and the friction coefficient in the low-speed range remains low. When the hard coating 20 is formed so that it adheres strongly to the base member 30, the hard coating 20 maintains its effects over a long period of use.

Figure 2:
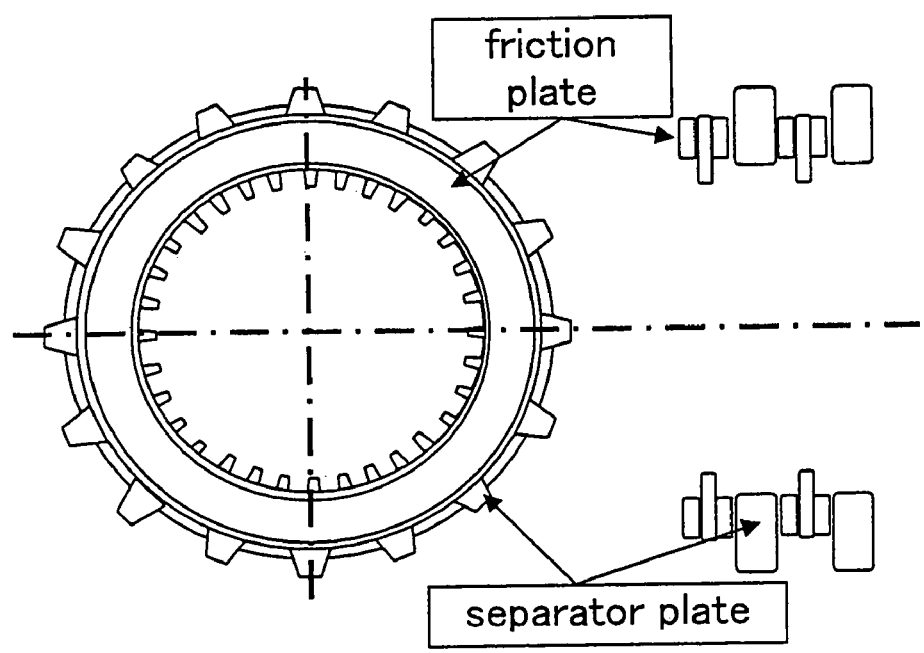
FIG. 2 is a schematic view used to explain the application of the invention to a wet type multiple-disc clutch/brake.
Figure 3:
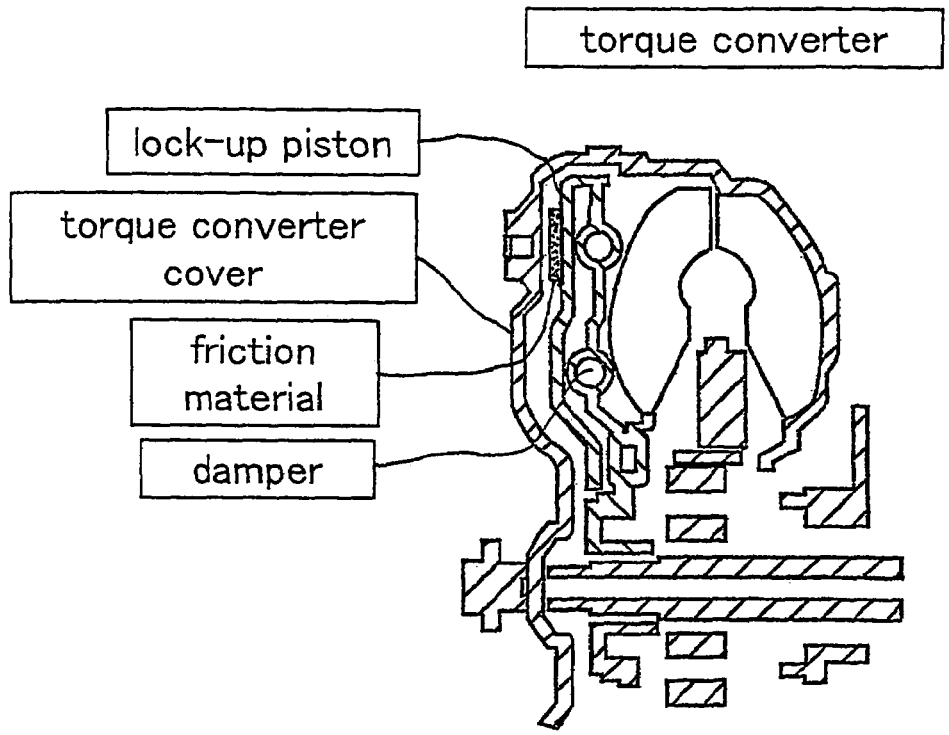
FIG. 3 is a schematic view used to explain the application of the invention to a lock-up clutch.
Figure 4:
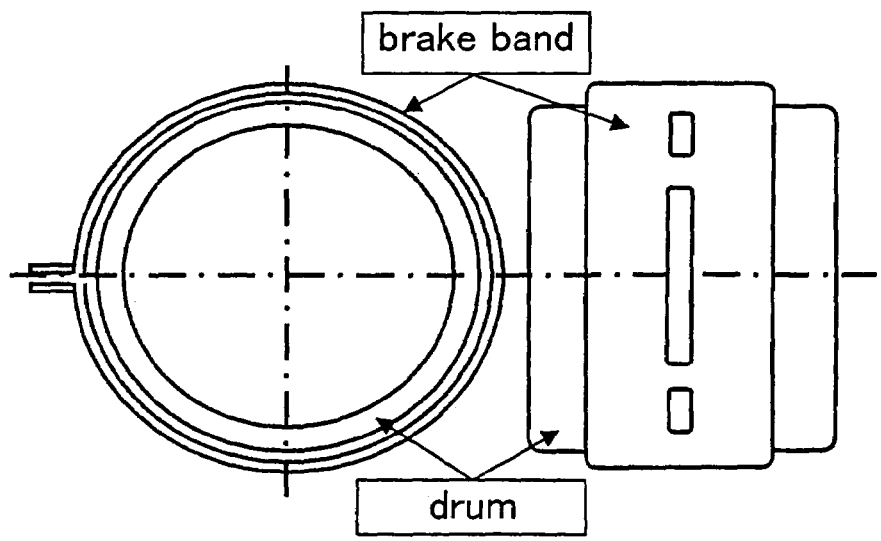
FIG. 4 is a schematic view used to explain the application of the invention to a band brake.

The friction mating member of the invention is applicable to wet type friction devices in automotive automatic transmissions, industrial machines and brake systems for industrial vehicles. Examples of the friction mating member 10 of the invention are shown in FIGS. 2, 3 and 4. In FIG. 2, the friction mating member is a separator plate included in a wet type multiple-disc clutch/brake for automatic transmissions and industrial vehicles. In FIG. 3, the friction mating member is a torque converter cover used in combination with a friction member of a lock-up clutch incorporated into the torque converter of an automatic transmission. In FIG. 4, the friction mating member is a drum included in a band brake for automatic transmissions and industrial vehicles.

EXAMPLES

The friction mating member of the Example in accordance with the invention was fabricated from a base member having a ground surface finished by polishing with a polishing compound. The ground and polished surface of the base member was coated with a hard coating of a composite material containing amorphous carbon and tungsten carbide.

In Comparative example 1, a friction mating member in was fabricated by coating a surface of a base member with a chromium or TiN coating.

In Comparative example 2, a friction mating member the ratio of the area of semispherical protrusions to the area of the surface of a coating applied to the surface of a base member was small.

In Comparative example 3, a friction mating member included a base member having a high degree of surface roughness.

In Comparative example 4, the friction member, which was a currently mass-produced friction mating member, was made simply by grinding a surface of a base member, with no application of any hard coating.

As shown in FIG. 5, the friction mating member in the Example according to the invention provided a large friction coefficient in a high-speed range, and a small friction coefficient in a low-speed range, and had a satisfactory $\mu$-V characteristic.

The friction mating member in Comparative example 1 provided a large friction coefficient in a high-speed range and a relatively large friction coefficient in a low-speed range. Such a result is due to the narrow elastic range of chromium or TiN, to the incapability of achieving uniform contact in the low-speed range, and also to the fact that the arithmetic average surface roughness of the surface excluding the semispherical protrusions is greater than that of a carbonaceous hard coating.

The friction mating member in Comparative example 2 could not provide a large friction coefficient in the high-speed range. This result was due to a low area ratio of the semispherical protrusions, and the resultant unsatisfactory smoothness of the surface of a friction member.

In a low-speed range, the friction mating member in Comparative example 3 provided a friction coefficient higher than that provided by the friction mating member in the Example according to the invention. However, it had an unsatisfactory $\mu$-V characteristic. This result was due to the high degree of surface roughness of the base member, its incapability of achieving uniform contact with a friction member, and insufficient utilization of the sliding property of the hard coating.

The friction mating member in Comparative example 4 could not provide a satisfactory friction coefficient in both a high-speed range and a low-speed range. This result was due to the properties of the simple ground, uncoated, surface of the base member.

Figure 6:
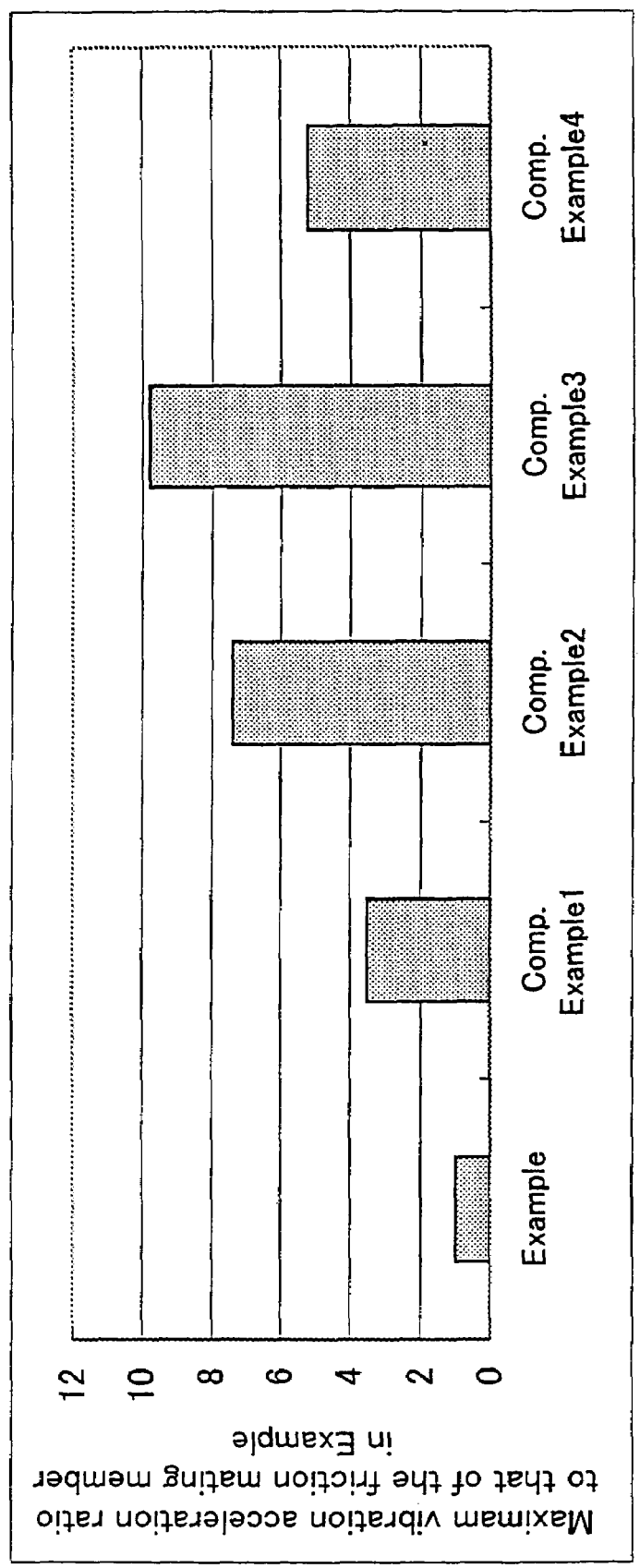
FIG. 6 is a first diagram showing the shudder-suppressing effect of the invention.
Figure 7:
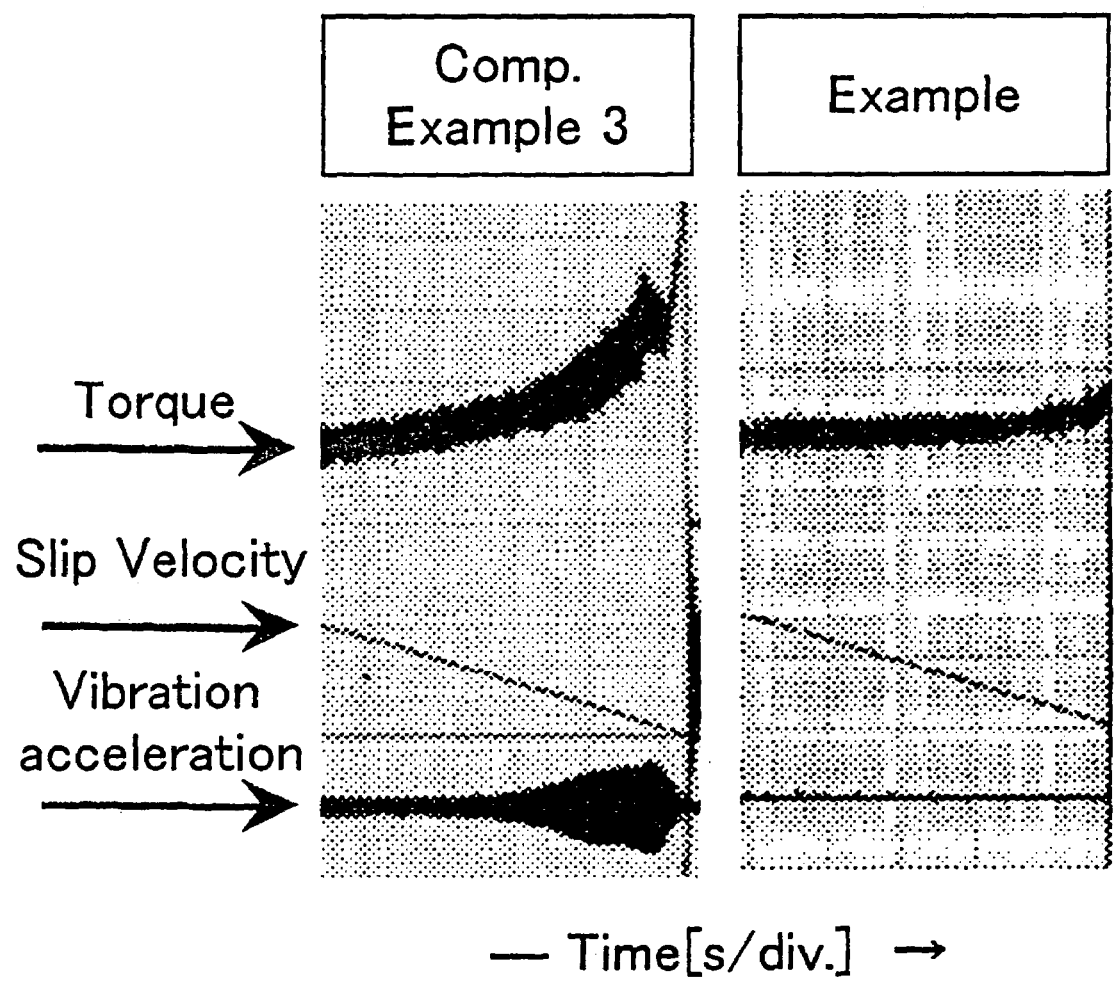
FIG. 7 is a second diagram showing the shudder-suppressing effect of the invention.

In FIGS. 6 and 7 which show the shudder suppressing effect of the invention, it is seen that the shudder suppressing effect of the friction mating member in the Example according to the invention is far higher than the shudder suppression exhibited by the friction mating members of Comparative examples 1 to 4.

Figure 8:
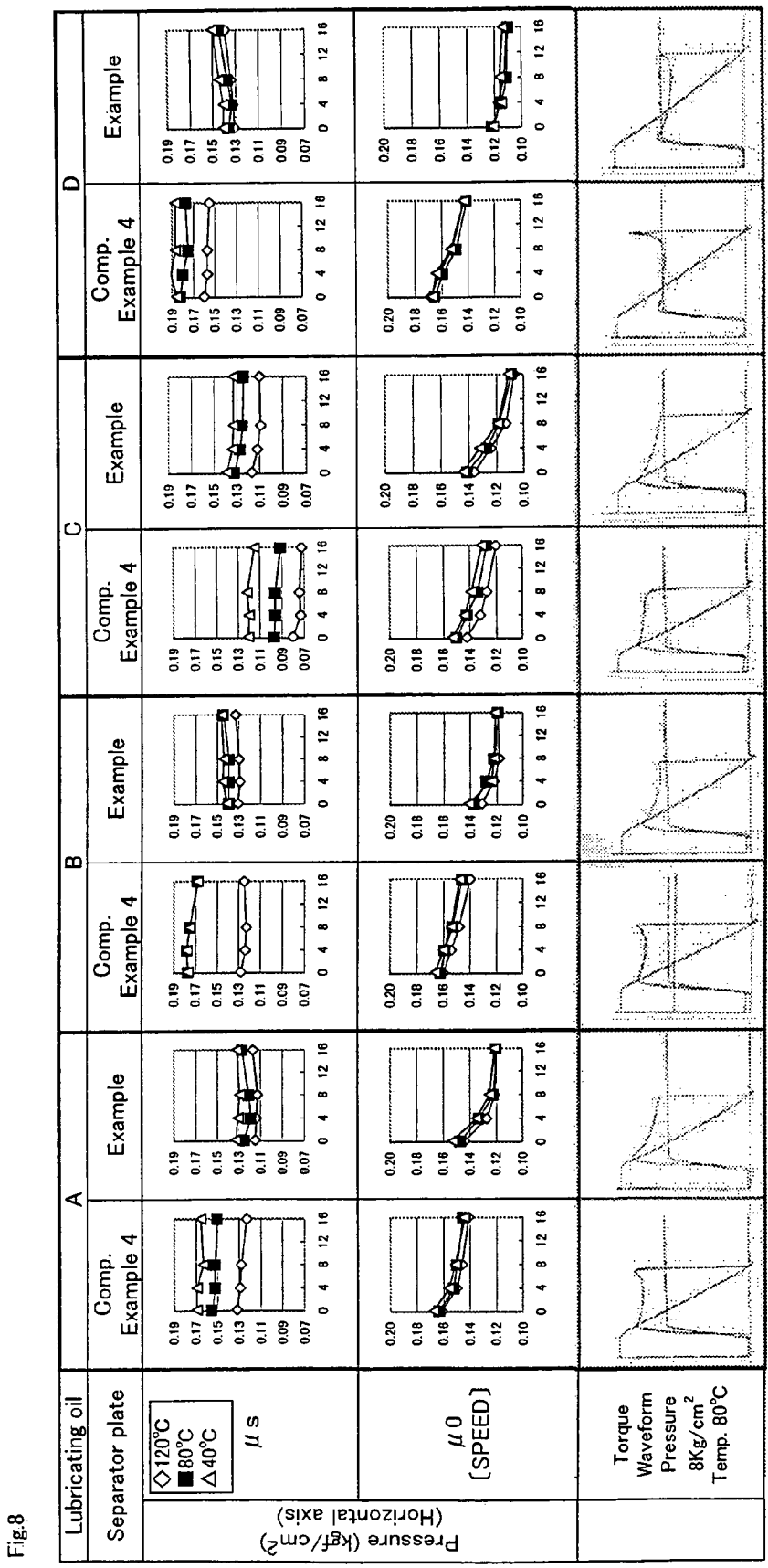
FIG. 8 is a diagram showing friction coefficients of friction mating members in an example in accordance with the invention, and in comparative example 4 in a low-speed range, and the μ-V characteristics of the friction mating members of the example in accordance with the invention and comparative example 4, for different types of lubricating oils.

FIG. 8 is a diagram showing friction coefficients provided by the friction mating members in Example and Comparative example 4 in a low-speed range, and the $\mu$-V characteristics of the friction mating members in Example and Comparative example 4 for different types of lubricating oils. Lubricating oils A, B, C and D are those that are commercially available on the market. As is obvious from FIG. 8, whereas the friction coefficient provided by the friction mating member in Comparative example 4 in a low-speed range, and the coefficient of static friction provided by the friction mating member in Comparative example 4, are dependent on the type of the lubricating oil and are greatly dependent on temperature, the friction coefficient provided by the friction mating member of the Example in accordance with the invention is almost entirely independent of the type of the lubricating oil and temperature.

The friction mating member, formed by providing the surface of the base member with a hard coating having a load point displacement characteristic in which the elastic range, in a load range of 1 to 50 mN, is at least 50%, is capable of coping with both increasing friction coefficient in a high-speed range and decreasing friction coefficient in a low-speed range without being affected by the type and deterioration of the lubricating oil. It is also capable of maintaining a $\mu$-V characteristic having a positive gradient over a long period of use. The friction mating member of the invention suppresses shudder by maintaining a positive gradient in its $\mu$-V characteristic, and thereby solves problems attributable to noise and vibration.

Since the $\mu$-V characteristic of the friction mating member of the invention is not dependent on the type of the lubricating oil, the friction mating member of the invention can be used in combination with any suitable lubricating oil. Since the friction mating member of the invention is capable of suppressing shudder, damping mechanisms incorporated into bodies and transmissions of vehicles can be omitted. Consequently cost reduction, resource conservation, and energy conservation, can be achieved.

We claim:

1. A friction mating member comprising a base member and a hard coating applied on the base member, said coating having an outer surface, wherein the hard coating has a load point displacement characteristic in which the ratio of elastic deformation to maximum indentation depth, in a load range of 1 to 50 mN, is at least 50%, wherein semispherical protrusions, having diameters in the range of 1 to 5 $\mu$m, are formed on said outer surface of said hard coating, the ratio of the area occupied by said protrusions to the total area of said outer surface of said hard coating is at least 3%, the arithmetic average surface roughness Ra of said outer surface of said hard coating, excluding the semispherical protrusions, is in the range of 4 to 50 nm, and the arithmetic average surface roughness Ra of the base member is not greater than 0.07 $\mu$m.

2. A friction mating member according to claim 1, wherein the thickness of said hard coating is in the range from 1 to 20 $\mu$m.

3. A friction mating member according to claim 1, wherein the hard coating is formed of a composite material containing tungsten carbide and amorphous carbon.

4. A friction mating member according to claim 2, wherein the hard coating is formed of a composite material containing tungsten carbide and amorphous carbon.

* * * * *